(No Model.)

A. E. KOCH.
NUT LOCK.

No. 292,234. Patented Jan. 22, 1884.

WITNESSES
F. L. Durand
E. G. Siggers

A. E. Koch,
INVENTOR
by C. A. Snow & Co,
Attorneys

UNITED STATES PATENT OFFICE.

AMBROSE E. KOCH, OF FLEETWOOD, PENNSYLVANIA, ASSIGNOR OF ONE-HALF TO DANIEL KOCH, OF SAME PLACE.

NUT-LOCK.

SPECIFICATION forming part of Letters Patent No. 292,234, dated January 22, 1884.

Application filed October 31, 1883. (No model.)

*To all whom it may concern:*

Be it known that I, AMBROSE E. KOCH, a citizen of the United States, residing at Fleetwood, in the county of Berks and State of Pennsylvania, have invented a new and useful Nut-Lock, of which the following is a specification, reference being had to the accompanying drawings.

This invention relates to nut-locks; and it has for its object to produce a device which shall possess superior advantages in point of durability and general efficiency.

To this end it consists in the combination of parts, which will be hereinafter fully described, and particularly pointed out in the claim.

Figure 1:
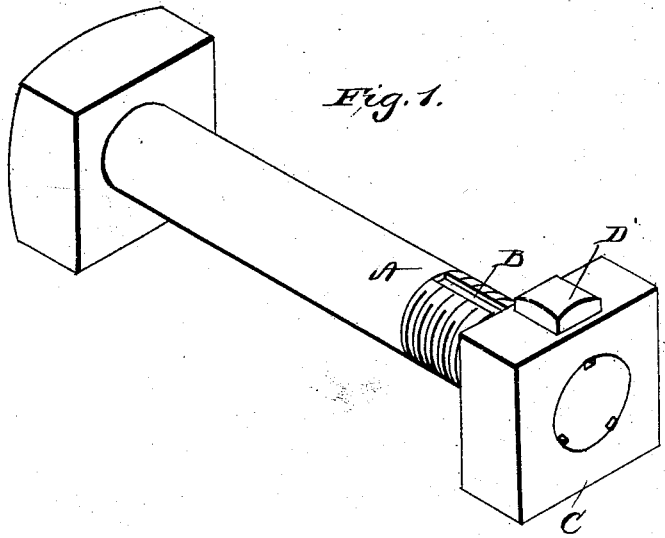
Figure 2:
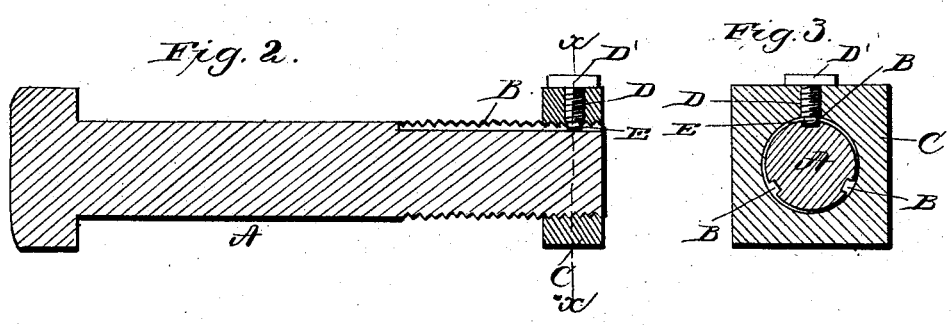
Figure 3:
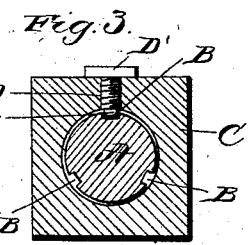
Figure 4:
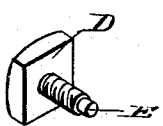

In the drawings hereto annexed, Figure 1 is a perspective view, showing a nut equipped with my improved locking device in position upon a bolt. Fig. 2 is a longitudinal vertical sectional view of the same. Fig. 3 is a transverse vertical sectional view on the line $x\,x$ in Fig. 2, and Fig. 4 is a detail view of the locking-screw detached.

The same letters refer to the same parts in all the figures.

A in the drawings designates the bolt, the threaded portion of which is provided with one or more shallow longitudinal grooves, B B. In the drawings hereto annexed I have shown the bolt A provided with three such grooves, and it may be stated that three or four will be the number of grooves usually to be employed upon a medium-sized bolt.

C designates the nut, which is of ordinary construction, and one side of which is provided with a screw-threaded perforation, D, in which works a small square-headed set-screw, D', the inner end of which terminates in a nipple, E, of suitable size to fit in any one of the grooves B in the bolt A.

From the foregoing description, taken in connection with the drawings hereto annexed, the operation and advantages of my invention will be readily understood. After the nut has been properly tightened upon the bolt, it is slightly turned, so as to cause the screw D to register with one of the grooves B, and the set-screw D is then turned or tightened, so as to cause the nipple E to enter the groove, thus binding or locking the nut securely upon the bolt, preventing the same from turning upon the bolt, caused by the vibrations of the rolling-stock.

It will be observed that by this construction and arrangement of parts the thread of the bolt is in nowise injured, and also that the nut may at any time be easily detached and replaced or tightened by simply loosening the screw D.

I claim as my invention and desire to secure by Letters Patent of the United States—

As an improvement in nut-locks, the combination of a bolt having one or more shallow longitudinal grooves extending throughout its threaded portion, a nut having a radial screw-threaded opening, and a set-screw seated in the said opening and terminating in a nipple at its inner end, substantially as herein set forth, and for the purpose stated.

In testimony that I claim the foregoing as my own I have hereto affixed my signature in presence of two witnesses.

AMBROSE E. KOCH.

Witnesses:
G. B. HARRIS,
C. W. DASHIELL.